3,700,653
DYE PREPARATIONS CONTAINING A METAL-
LIZED DISAZO DYE AND MONOPROPANOL-
AMINE
Alfred Frei, Binningen, Basel-Land, and August Schweizer,
Muttenz, Basel-Land, Switzerland, assignors to Sandoz
Ltd. (also known as Sandoz A.G.), Basel, Switzerland
No Drawing. Filed Oct. 29, 1968, Ser. No. 771,652
Claims priority, application Switzerland, Oct. 30, 1967,
15,207/67; Nov. 24, 1967, 16,573/67; Dec. 6, 1967,
17,060/67
Int. Cl. C09b 45/28
U.S. Cl. 260—148                                                    15 Claims

ABSTRACT OF THE DISCLOSURE

Stable, concentrated dye preparations containing one metallized dye of the azo or azomethine series and monopropanolamine or an aminothiole.

This invention relates to stable, concentrated dye preparations containing one metallized dye of the azo or azomethine series and monopropanolamine or an aminothiole. Highly suitable dye preparations of this type are liquid preparations of water soluble metallized dyes containing, per 1 part by weight of dye, 2 to 15 or, preferably, 5 to 15 parts by weight of water and 0.5 to 5 or, preferably, 0.5 to 2 parts by weight of monopropanolamine.

Dyes of the azo series, e.g. copper-containing disazo dyes, are especially suitable for these preparations. It is desirable for them to bear the radical of a tetrazotized diaminodiphenyl, e.g. the radical of a tetrazotised 4,4'-diamino - 3,3' - dialkoxy-1,1'-diphenyl, and as coupling component a hydroxynaphthalenesulphonic acid, e.g. 2 moles of a hydroxynaphthalenesulphonic acid or 2 moles of an aminohydroxynaphthalenesulphonic acid, or more particularly 2 moles of a 1-amino-8-hydroxynaphthalenesulphonic acid. An example of such dyes is that of the formula (I) 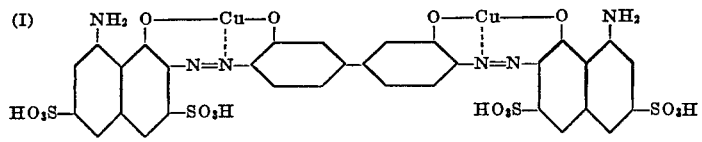

Dye preparations, practically without water of comparably good quality are obtained when 1–5% or, preferably, 3–5% (based on the weight of the dye) of monopropanolamine, particularly 1-amino-2-hydroxy-propane, is employed. Alternatively, normal monopropanolamine can be used.

Dyebaths, padding liquors and printing pastes are prepared with these preparations for the exhaustion dyeing, pad dyeing or printing of textiles. A copper-containing disazo dye (obtained from a tetrazotised diaminodiphenyl and an aminohydroxynaphthalenesulphonic acid as coupling component may also be selected, together with monopropanolamine, form a preparation which is primarily suitable for the exhaustion or pad dyeing or printing of cellulosic fibres such as cotton, linen and hemp. Generally, the dyes are incorporated in the preparations in the form of their salts, e.g. as a salt of an alkali metal. The preparations are highly stable; after lengthy periods of storage the dyes show no sign of decomposition through the action of atmospheric moisture or light. The preparations are thus storable for long times at room temperature. They are unaffected by frost and are not subject to mould or mildew formation.

Further assistants can be incorporated in the liquid preparations if desired; for example dyeing assistants, such as pH stabilizers, or dispersing agents, such as alcohols or ketones, e.g. diacetone alcohol.

Dry or liquid preparations of the defined type are prepared by mixing the afore-named components, with heating for a short time if required. They are suitable for dyeing paper, either in the stock or by dipping and coating methods, for which purpose they can be applied as true solutions or as dispersions, previously diluted with water as required.

The advantage of the liquid preparations is ease of handling. The troublesome dusting which occurs in weighing out powder dyes is absent with liquids, and they are more suitable for application in continuous dyeing processes.

It is of advantage to employ dyes bearing water-solubilizing groups, e.g. carboxylic acid, sulphonic acid amide or preferably sulphonic acid groups.

To exemplify the radicals of tetrazo compounds which can be employed for the formation of disazo dyes of special interest for the preparations, the following diaminodiphenyl compounds may be named:

4,4'-diamino-3,3'-dihydroxy-1,1'-diphenyl,
4,4'-diamino-3,3'-dimethoxy-1,1'-diphenyl,
4,4'-diamino-3,3'-diethoxy-1,1'-diphenyl,
4,4'-diamino-3,3'-dicarboxymethoxy-1,1'-diphenyl.

Examples of suitable coupling components are those bearing active methylene groups, e.g. acetoacetylarylamide, pyrazolones and aminopyrazoles, such as 1-phenylpyrazolone-5 and 1-phenyl-5-aminopyrazol; hydroxynaphthalenesulphonic acids, e.g.:

2-hydroxynaphthalene-6-sulphonic acid,
2-hydroxynaphthalene-8-sulphonic acid,
2-hydroxynaphthalene-3,6-disulphonic acid,
2-hydroxynaphthalene-5,7-disulphonic acid,
2-hydroxynaphthalene-6,8-disulphonic acid,
2-hydroxynaphthalene-3,6,8-trisulphonic acid,
1-hydroxynaphthalene-4-sulphonic acid,
1-hydroxynaphthalene-5-sulphonic acid,
1-hydroxynaphthalene-3,6-disulphonic acid,
1-hydroxynaphthalene-3,8-disulphonic acid,
1-hydroxynaphthalene-4,6-disulphonic acid,
1-hydroxynaphthalene-4,7-disulphonic acid,
1-hydroxynaphthalene-3,6,8-trisulphonic acid,
aminohydroxynaphthalenesulphonic acids, e.g.:
  2-amino-5-hydroxynaphthalene-7-sulphonic acid,
  2-phenylamino-5-hydroxynaphthalene-7-sulphonic acid,
  2-amino-8-hydroxynaphthalene-6-sulphonic acid,
  1-amino-8-hydroxynapthalene-2,4-disulphonic acid,
  1-amino-8-hydroxynaphthalene-3,6-disulphonic acid,
  1-amino-8-hydroxynaphthalene-4,6-disulphonic acid,
  1-phenylamino-8-hydroxynaphthalene-3,6-disulphonic acid.

British patent specification 982,735 discloses stable dye preparations which contain the dye of Formula I and amino alcohols. In comparison with these preparations, the preparations of the present invention show superior heat and storage stability; the liquid preparations in particular have notably good storage stability.

EXAMPLE 1

The disazo dye of formula

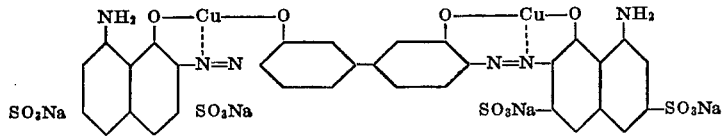

is prepared by coupling tetrazotized, 4,4'-diamino-3,3'-dimethoxy-1,1'-diphenyl with 1-acetylamino-8-hydroxy-naphthalene-3,6-disulphonic acid, coppering the product with simultaneous demethylation, and splitting off the acetyl groups. 109 parts of the filtercake of this dye of approximately 50% moisture content are washed on the filter with a solution of 250 parts of sodium chloride and 40 parts of 1-amino-2-hydroxypropane per litre of water. The dye is then dried at 70–80°. A sample is stored for 20 days at 80° in an enclosed air atmosphere to accelerate the ageing process and thereby test its stability. The chromatogram of the tested sample shows that only small amounts of decomposition products are present. On paper it gives a blue dyeing which is equally as bright as, and not appreciably different in shade from, the dyeing produced with a sample which has been stabilized in the same way but not submitted to the accelerated ageing test. A sample of the nonstabilizing starting dye which has not been submitted to the ageing test gives a chromatogram showing a substantial proportion of grey decomposition products; in comparison with the stabilized tested sample it gives a redder and flatter blue dyeing on paper.

EXAMPLE 2

109 parts of the copper containing disazo dye defined in Example 1 are added in the form of the moist filtercake to a solution of 105 parts of 1-amino-2-hydroxypropane, 25 parts of sodium sulphate and 150 parts of water, with continued stirring until a homogeneous mixture is obtained. The mixture is dried in an atomizing drier to give a preparation showing good stability similar to that obtained by the procedure of Example 1.

EXAMPLE 3

109 parts of the dried and pulverized starting dye of Example 1, 5.45 parts of 1-amino-2-hydroxypropane and 30 parts of sodium sulphate are homogeneously mixed in a mixer. The preparation thus obtained has a storage stability comparable to that of the preparation of Example 1.

EXAMPLE 4

109 parts of the copper containing disazo dye of Example 1 in the form of a moist filtercake and 3 parts of 1-amino-2-hydroxypropane are homogeneously mixed in a kneading machine and the mixture dried. The dye preparation thus obtained shows similarly good storage stability as that prepared by the procedure of Example 1.

EXAMPLE 5

109 parts of the starting dye of Example 1 in the form of the moist filtercake are suspended in a solution of 250 parts of sodium chloride and 40 parts of 1-amino-2-hydroxypropane per litre of water. After filtering and drying, a dye preparation is obtained which withstands the accelerated ageing test equally as well as the preparation of Example 1.

Dyeing example

A charge of 70 parts of chemically bleached sulphite cellulose pulp and 30 parts of chemically bleached sulphate cellulose pulp in 200 parts of water is beaten in a pulper to the desired degree of fineness. At this point 0.05 part of the dye preparation of Example 2 are strewn in, and after 20 minutes the stock in converted into an absorbent paper dyed in a pale blue shade.

Preparation of a dyebath 150 parts of softened water are run into a stainless steel dyebath of 200 millilitres capacity; 0.1 part of the dye preparation of Example 2 and 0.5 part of Glauber's salt are dissolved in the water. In this dyebath 5 parts of a cotton fabric are dyed by the normal exhaustion method in a fast-to-light greenish blue shade.

Preparation of a padding liquor 4 parts of the dye preperation of Examples 1 and 20 parts of urea are dissolved in 400 parts of water, and 2 parts of locust bean gum are strewn into the solution. Additions of 3 parts of lauryl glycol ether sulphonate containing 3 moles ethylene oxide groups, 3 parts of nonylphenyl polyglycol ether containing 4.5 moles ethylene oxide groups, and 5 parts of glacial acetic acid follow, whereupon the padding liquor is ready for application.

Preparation of a printing paste 200 parts of water at 40° are run into 10 parts of the dye preparation of Example 1, and the resulting solution is stirred into 520 parts of a 30% aqueous crystal gum solution, previously mixed with 50 parts of urea, 50 parts of thiodiethylene glycol and 60 parts of a 30% aqueous ammonium sulphate solution.

EXAMPLE 6

109 parts of the dye preparation of Example 1 in the form of a 40% aqueous paste are added to 600 parts of water and stirred to form a homogeneous dispersion, whereafter 100 parts of 1-amino-2-hydroxy propane are added thereto to dissolve the dye. The dye solution is made up to 1000 parts; this dilute solution is storable for several months.

A dyebath can be prepared by adding 3 parts of this preparation and 2 parts of anhydrous sodium carbonate to 3000 parts of softened water with stirring.

EXAMPLE 7

109 parts of the dye of Example 1 in the form of a 40% aqueous paste are dissolved in a solution of 55 parts of 1-amino-2-hydroxypropane, 50 parts of diacetone alcohol and 1000 parts of water. The dye preparation is diluted to 1400 parts and is then storable at room temperature for several months.

EXAMPLE 8

109 parts of the dye of Example 1 in the form of a 40% aqueous paste are dissolved in a solution of 210 parts of 1-amino-2-hydroxypropane and 400 parts of water. This dye preparation is storable at room tempearture for several months. In place of 1-amino-2-hydroxypropane, normal monopropanolamine can be employed, which gives a preparation of similarly good stability.

EXAMPLE 9

100 parts of chemically bleached sulphite cellulose pulp in water are refined in a beater, 1 part of the dye preparation of Example 6 is added, and after 15 minutes the paper stock is sized and fixed. Paper made from this stock is dyed in a greenish blue shade of medium depth which has good fastness properties. The backwater from the papermaking machine is colourless.

EXAMPLE 10

A dyebath is prepared with 3000 parts of softened water, 2 parts of anhydrous sodium carbonate and 3 parts of the dye preparation of Example 7. At 30° 100 parts of a wet-out cotton fabric are entered into the bath, after which 10 parts of sodium sulphate are added. The bath is raised to 100° in 30 minutes, with two further additions of 10 parts of sodium sulphate at 50° and 70°. After dyeing for 15 minutes at 100° a final 10 parts of sodium sulphate are added and the bath is then allowed to cool. At 50° the dyed cotton is removed from the bath, rinsed well with cold water and dried at 60°. The greenish blue dyeing obtained is fast to light and wet treatments.

The dye used for the dye preparations referred to in the preceding examples can be replaced by the dyes of Formulae II, III or IV below, with which preparations of similarly good quality are obtained.

(II)
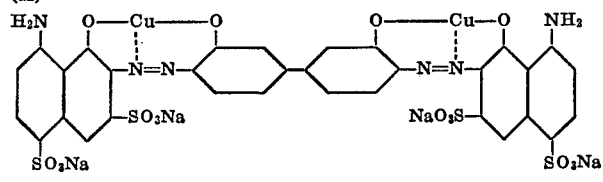

(III)
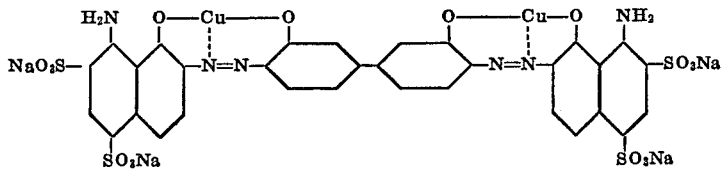

(IV)
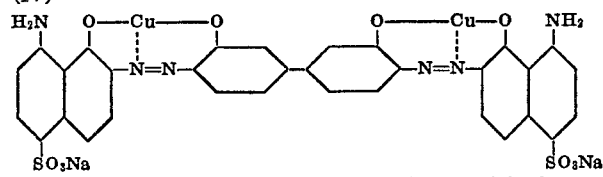

Having thus disclosed the invention what we claim is:

1. A stable concentrated dye preparation of metallized disazo dye and monopropanolamine, the amount of monopropanolamine being from 0.5 to 5 parts by weight per part by weight of dye.

2. Dye preparation according to claim 1 wherein the monopropanolamine is normal monopropanolamine.

3. Dye preparation according to claim 1 wherein the monopropanolamine is 1-amino-2-hydroxypropane.

4. Liquid dye preparation according to claim 1 wherein the metallized dye is water-soluble and which contains 2

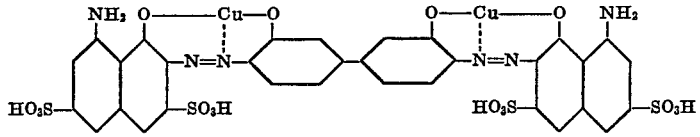

to 15 parts by weight of water per part by weight of dye.

5. Dye preparation according to claim 1 wherein the metallized dye is copperized dye.

6. Dye preparation according to claim 5 wherein the disazo dye bears the radical of a tetrazotized diaminodiphenyl.

7. A stable concentrated dye preparation according to claim 6 containing one copperized disazo dye bearing the radical of a tetrazotized 4,4'-diamino-3,3'-dialkoxy-1,1'-diphenyl and 2 moles of a 1-amino-8-hydroxynaphthalene-sulphonic acid as coupling component.

8. A liquid preparation according to claim 7 with 1 part by weight of copperized water-soluble disazo dye bearing the radical of a tetrazotized 4,4'-diamino-3,3'-dialkoxy-1,1'-diphenyl and 2 moles of a 1-amino-8-hydroxynaphthalene-sulphonic acid as coupling component, 2 to 15 parts by weight of water and 0.5 to 5 parts by weight of monopropanolamine.

9. Dye preparation according to claim 6 wherein the tetrazotized diaminodiphenyl is coupled with 2 moles of 1-amino-8-hydroxynaphthalene-sulphonic acid.

10. Dye preparation according to claim 1 wherein the azo dye bears the radical of tetrazotized 4,4'-diamino-3,3'-dialkoxy-1,1'-diphenyl.

11. Liquid dye preparation according to claim 1 wherein the metallized dye is water-soluble and which contains 5 to 15 parts by weight of water and 0.5 to 2 parts by weight of monopropanolamine per part by weight of dye.

12. Dye preparations according to claim 1 wherein the dye is dye of the formula

13. Dye preparation according to claim 1 wherein the dye is dye of the formula

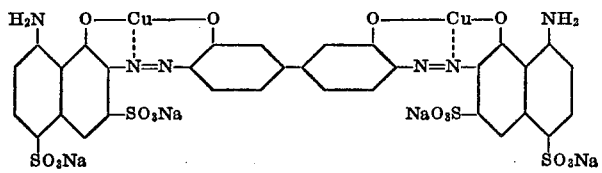

14. Dye preparations according to claim 1 wherein the dye is dye of the formula

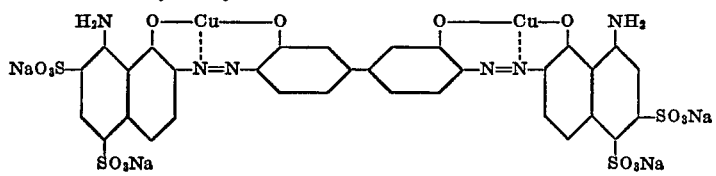

15. Dye preparations according to claim 1 wherein the dye is dye of the formula
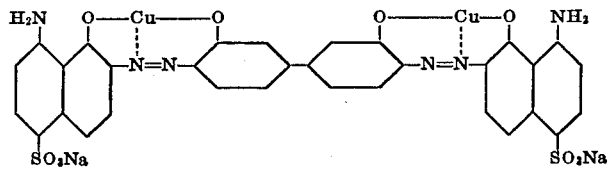
References Cited
UNITED STATES PATENTS
2,842,536 7/1958 Bauer et al. _____ 260—148
FOREIGN PATENTS
982,735 2/1965 Great Britain _____ 260—148
LEWIS GOTTS, Primary Examiner
D. M. PAPUGA, Assistant Examiner
U.S. Cl. X.R.
260—161